(12) United States Patent
Takeyama et al.

(10) Patent No.: US 9,957,695 B2
(45) Date of Patent: May 1, 2018

(54) WORK MACHINE (71) Applicant: KCM Corporation, Kako-gun, Hyogo (JP)

(72) Inventors: Takashi Takeyama, Tsuchiura (JP); Keigo Kikuchi, Tsuchiura (JP); Katsutaka Hara, Tsuchiura (JP); Masashi Yamashita, Tsuchiura (JP)

(73) Assignee: KCM CORPORATION, Hyogo (JP)

( * ) Notice: Subject to any disclaimer, the term of this patent is extended or adjusted under 35 U.S.C. 154(b) by 0 days. days.

(21) Appl. No.: 15/508,205

(22) PCT Filed: Dec. 25, 2015

(86) PCT No.: PCT/JP2015/086208
§ 371 (c)(1),
(2) Date: Mar. 2, 2017

(87) PCT Pub. No.: WO2016/104691
PCT Pub. Date: Jun. 30, 2016

(65) Prior Publication Data
US 2017/0284059 A1    Oct. 5, 2017

(30) Foreign Application Priority Data
Dec. 26, 2014    (JP) .................................. 2014-265818

(51) Int. Cl.
*B60K 1/04*    (2006.01)
*B60K 5/00*    (2006.01)
(Continued)

(52) U.S. Cl.
CPC ............ *E02F 9/0866* (2013.01); *B60K 13/02* (2013.01); *B60K 13/04* (2013.01); *E02F 9/00* (2013.01);
(Continued)

(58) Field of Classification Search
CPC ... B60K 1/04; B60K 5/00; B60K 6/00; B60K 15/003; B60K 2001/005; B60K 6/20
See application file for complete search history.

(56) References Cited

U.S. PATENT DOCUMENTS

2010/0031644 A1    2/2010  Keane et al.
2015/0000256 A1*   1/2015  Kobayashi ................ F01N 3/10
                                                          60/282
(Continued)

FOREIGN PATENT DOCUMENTS

JP    2012-030736 A    2/2012
JP    2012-154030 A    8/2012
(Continued)

OTHER PUBLICATIONS

International Search Report of PCT/JP2015/086208 dated Mar. 22, 2016.

*Primary Examiner* — Bryan A Evans
(74) *Attorney, Agent, or Firm* — Mattingly & Malur, PC (57) ABSTRACT

An exhaust system of a work machine is equipped with a first exhaust system, a second exhaust system, and a third exhaust system. The first exhaust system and the third exhaust system are arranged to be in parallel with respective one ends directed in the same direction. In a plan view, the second exhaust system is arranged with the other end side directed in the same direction as the one end sides of the first exhaust system and the third exhaust system to be in parallel with the first exhaust system and the third exhaust system between the first exhaust system and the third exhaust system and, in a side view, is arranged above the first exhaust system and the third exhaust system.

4 Claims, 13 Drawing Sheets

(51) Int. Cl.

| | |
|---|---|
| *B60K 6/20* | (2007.10) |
| *E02F 9/08* | (2006.01) |
| *B60K 13/02* | (2006.01) |
| *B60K 13/04* | (2006.01) |
| *E02F 9/00* | (2006.01) |
| *F01N 3/28* | (2006.01) |
| *F01N 3/10* | (2006.01) |
| *F01N 3/20* | (2006.01) |
| *F02M 35/04* | (2006.01) |
| *E02F 3/34* | (2006.01) |

(52) U.S. Cl.
CPC ............ *E02F 9/0891* (2013.01); *F01N 3/103* (2013.01); *F01N 3/206* (2013.01); *F01N 3/2066* (2013.01); *F01N 3/28* (2013.01); *F02M 35/042* (2013.01); *E02F 3/34* (2013.01); *F01N 2570/10* (2013.01); *F01N 2570/12* (2013.01); *F01N 2570/14* (2013.01); *F01N 2610/02* (2013.01)

(56) References Cited

U.S. PATENT DOCUMENTS

2015/0082774 A1* 3/2015 Kouno .................. F01N 3/2066
                                                                               60/295
2015/0330056 A1* 11/2015 Himoto .................. E02F 9/0866
                                                                              180/309

FOREIGN PATENT DOCUMENTS

| JP | 2013-104394 A | 5/2013 |
|---|---|---|
| JP | 2014-084832 A | 5/2014 |

\* cited by examiner

WORK MACHINE

TECHNICAL FIELD

The present invention relates to a work machine such as a wheel loader.

BACKGROUND ART

In work machines like wheel loaders and hydraulic excavators, an engine, accessories and the like for the engine are arranged in a machine room defined by a housing cover. As the accessories for the engine, there are cited a radiator for engine cooling, an exhaust system for treating the exhaust gas discharged from the engine and the like. Of these accessories, the exhaust system is arranged in an engine room and over the engine (refer to Patent Literature 1).

CITATION LIST

Patent Literature

Patent Literature 1: JP 2013-104394 A

SUMMARY OF THE INVENTION

Technical Problem

The work machine described in the foregoing Patent Literature is equipped as the exhaust system with an oxidation catalyst and a DPF (Diesel Particulate Filter). In order to cope with the emission control in these years, a requirement has arisen to arrange a urea SCR (Selective Catalytic Reduction), for example. However, it is becoming difficult to arrange various exhaust systems within a limited body space.

Solution to Problem

According to the first mode of the present invention, the work machine is equipped with an engine for the work machine and an exhaust system for treating exhaust gas from the engine, wherein the exhaust system is equipped with a first exhaust system taking an almost cylindrical shape and provided with a first inflow port for the exhaust gas on one end side and a first discharge port for the exhaust gas on the other end side; a second exhaust system taking an almost cylindrical shape and provided with a second inflow port for the exhaust gas from the first exhaust system on one end side and a second discharge port for the exhaust gas on the other end side, the second exhaust system being connected on a downstream side of the first exhaust system; and a third exhaust system taking an almost cylindrical shape and provided with a third inflow port for the exhaust gas from the second exhaust system on one end side and a third discharge port for the exhaust gas on the other end side, the third exhaust system being connected on a downstream side of the second exhaust system; wherein the first exhaust system and the third exhaust system are arranged to be in parallel with the respective one ends directed in the same direction; wherein in a plan view, the second exhaust system is arranged with the other end side directed in the same direction as the respective one end sides of the first exhaust system and the third exhaust system to be in parallel with the first exhaust system and the third exhaust system between the first exhaust system and the third exhaust system, the second exhaust system in a side view being arranged above the first exhaust system and the third exhaust system; and wherein the exhaust system is attached to the work machine so that in a plan view, the third exhaust port comes close to a center line extending in a front-rear direction of the work machine with the extending direction of the third exhaust system slanted relative to the extending direction of the center line.

Advantageous Effects of Invention

According to the present invention, it is possible to arrange the exhaust system within a limited space.

DESCRIPTION OF EMBODIMENT

One embodiment of a work machine according to the present invention will be described with reference to FIG. 1 through FIG. 13.

Figure 1:
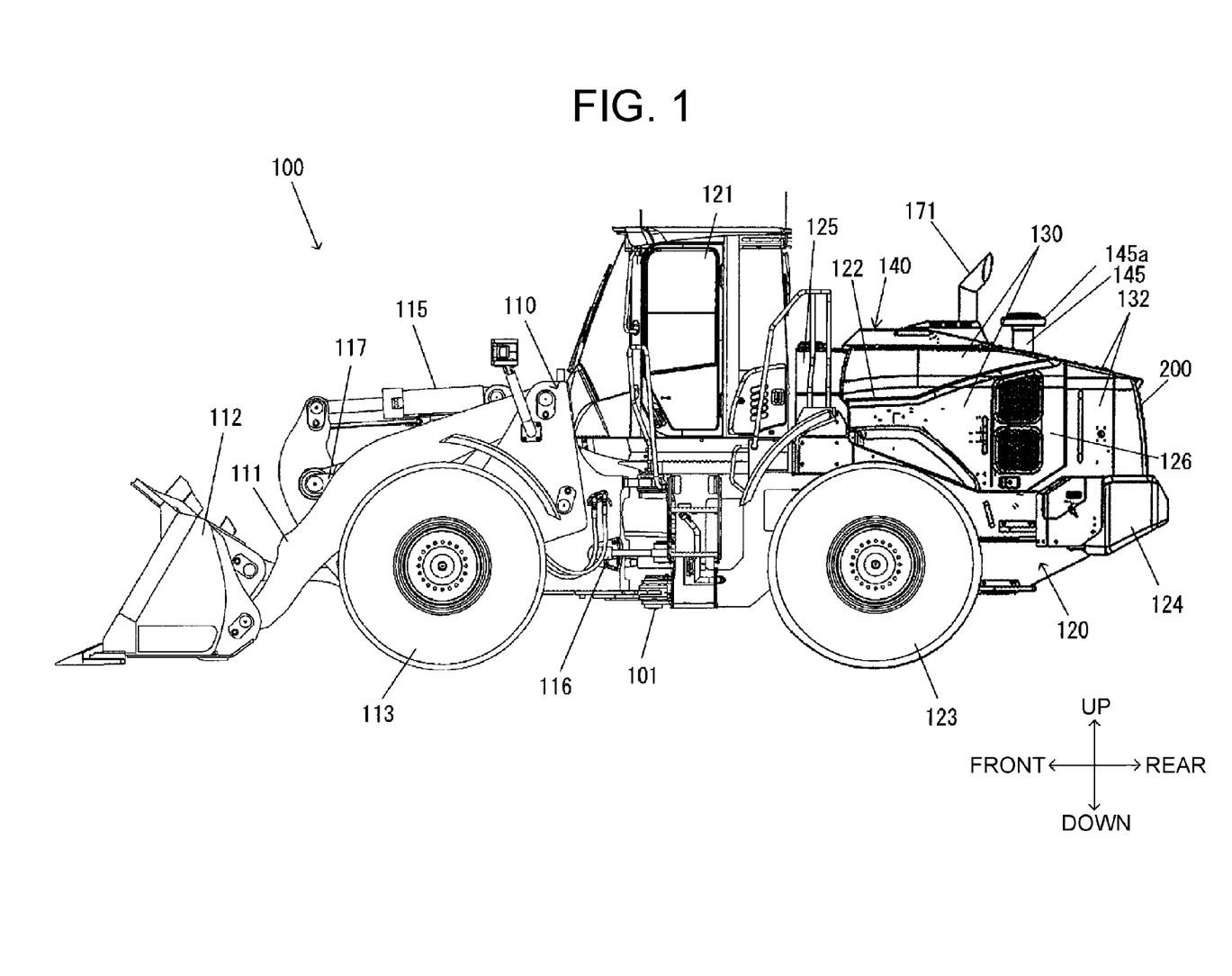
FIG. 1 is a side view of a wheel loader being one example of a work machine.
Figure 2:
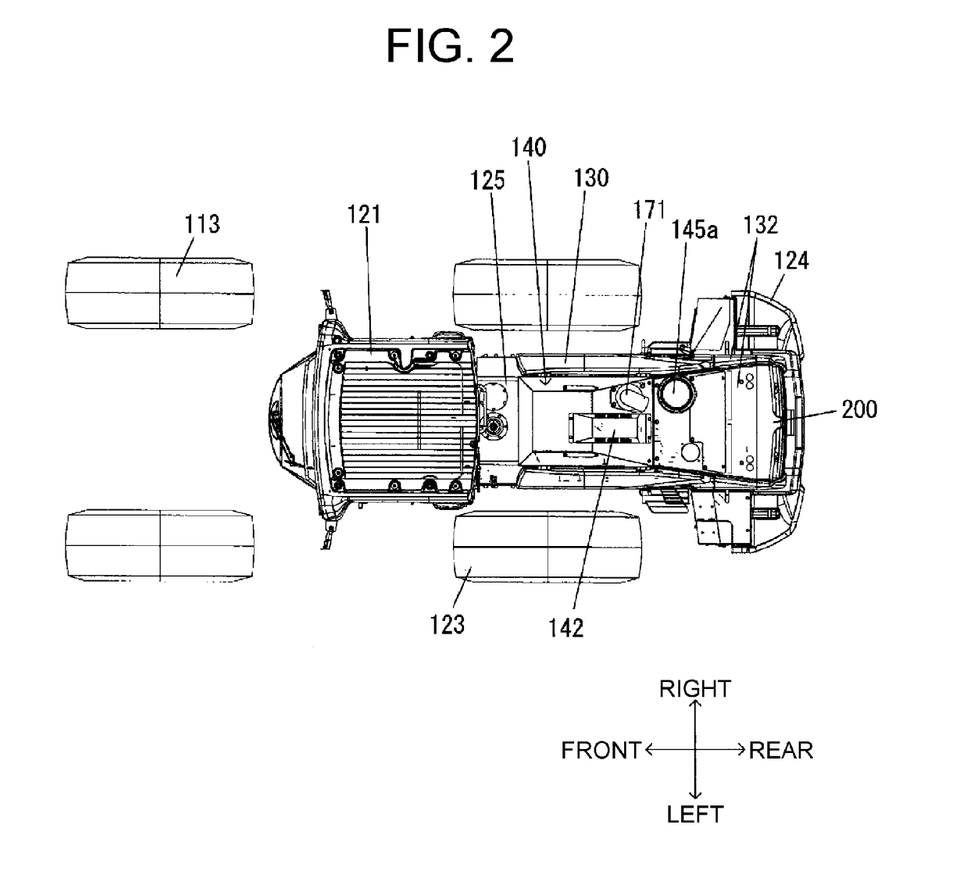
FIG. 2 is a plan view primarily displaying a rear body of the wheel loader.
Figure 3:
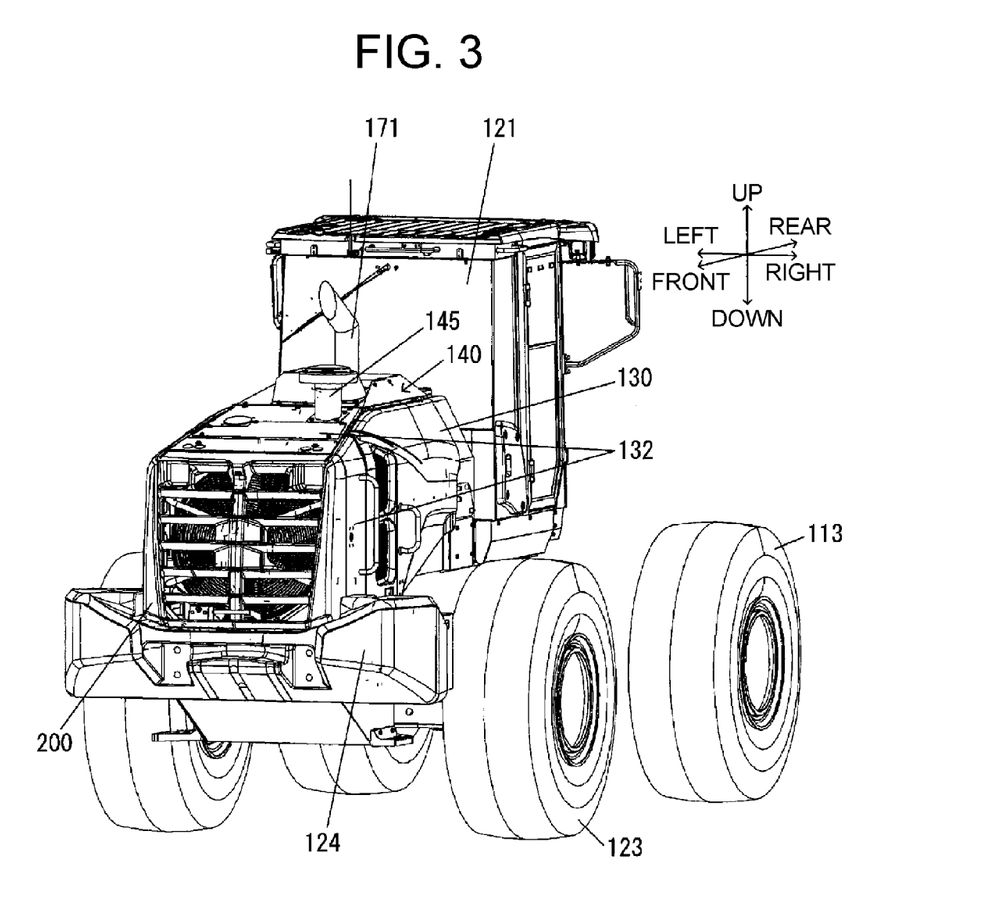
FIG. 3 is a perspective view of the rear body as viewed from the obliquely rear side.
Figure 4:
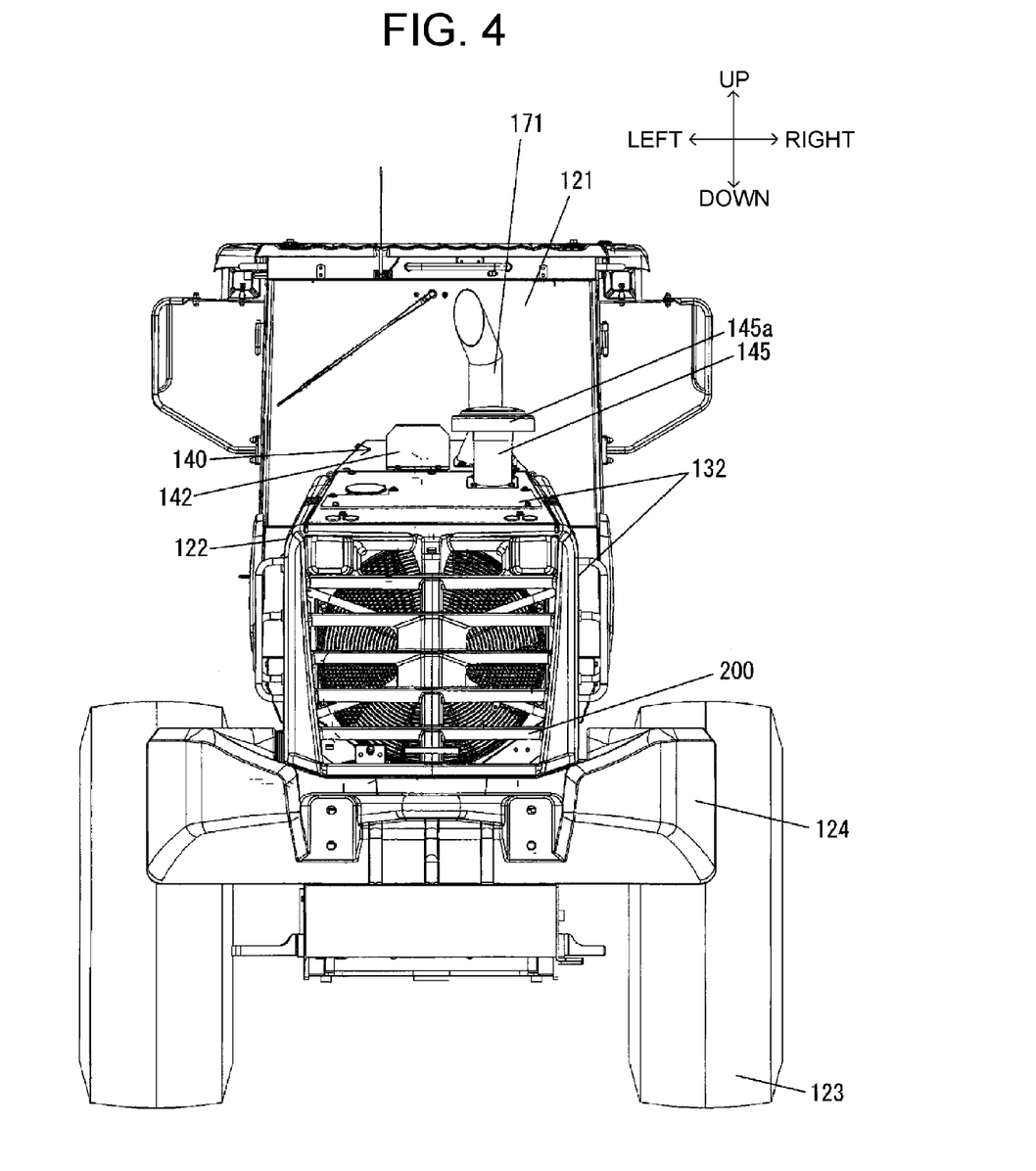
FIG. 4 is a rear view of the wheel loader.
Figure 5:
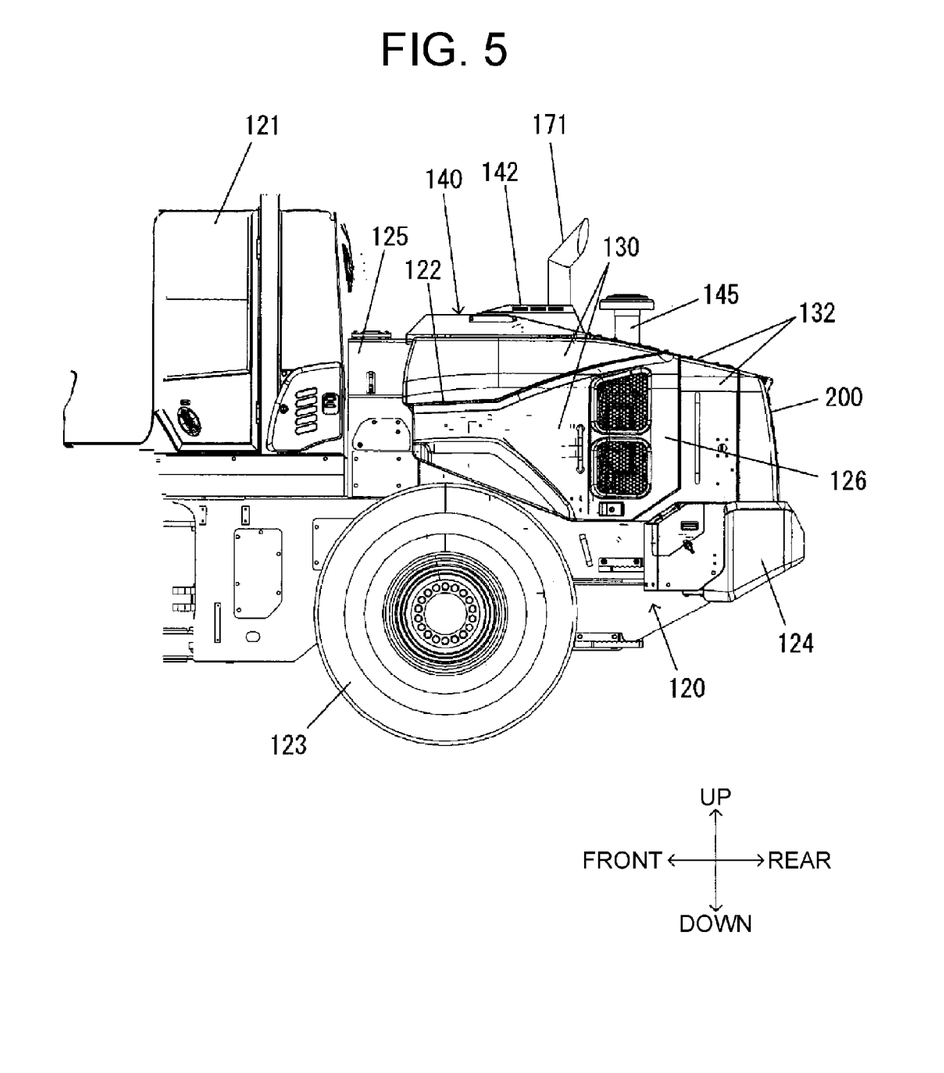
FIG. 5 is a view of the rear body as viewed from the left side.

FIG. 1 is a side view of a wheel loader being one example of the work machine according to the present embodiment, and FIG. 2 is a plan view primarily displaying a rear body of this wheel loader 100. FIG. 3 is a perspective view of the rear body of the wheel loader 100 as viewed from the obliquely rear side, FIG. 4 is a rear view of the wheel loader 100, and FIG. 5 is a view of the rear body as viewed from the left side.

The wheel loader 100 is configured by a front body 110 having an arm 111, a bucket 112, tires 113 and the like and a rear body 120 having an operator's cabin 121, a machine room (engine room) 122, a cooler chamber 126, tires 123 and the like. The rear body 120 attaches counter weights 124 at rear portions. The engine room 122 is provided with a hydraulic fluid tank 125 on a front side thereof.

The arm 111 is vertically rotated (moved to look up and down) by the driving of an arm cylinder 117, and the bucket 112 is vertically rotated (damped or crowded) by the driving of a bucket cylinder 115. The front body 110 and the rear body 120 are coupled by a center pin 101 to be rotatable with each other, and the front body 110 is bent right and left relative to the rear body 120 through the extension/contraction of a steering cylinder 116. For the sake of convenience in description, the present embodiment prescribes front, rear, right and left directions and upper and lower directions as indicated in each figure. Further, in the present embodiment, of members configuring the wheel loader 100, those in each figure that are necessary to be omitted from being mentioned for description will be omitted from being described entirely or in part.

The engine room 122 is coved with a housing cover 130 and an engine hood 140. That is, the engine room 122 is defined by the housing cover 130, the engine hood 140 and a bulkhead 160 shown in FIG. 6 and FIG. 7 referred to later. The engine hood 140 has a tailpipe 171 protruding therefrom for discharging exhaust gas. Further, the engine hood 140 is provided with an opening 141 for maintenance of a urea water injection valve 421 and a urea water supply pipe 425 both referred to later. The opening 141 is closed with a detachable cover 142.

The cooler chamber 126 is provided on a rear side of the engine room 122 and is partitioned from the engine room 122 by the bulkhead 160 shown in FIG. 6 and FIG. 7 referred to later. Lateral faces of the cooler chamber 126 is covered with a part of the housing cover 130 and a cooler housing cover 132, and an upper face of the cooler chamber 126 is covered with the cooler housing cover 132. That is, the cooler chamber 126 is defined by a part of the housing cover 130, the cooler housing cover 132 and the bulkhead 160.

The cooler chamber 126 is provided therein with a plurality of coolers (heat exchangers) not shown and the like such as a radiator not shown for cooling coolant for the engine 301, an oil cooler not shown and the like for cooling hydraulic fluid and also with an air cleaner 310. The cooler housing cover 132 opens on a rear side. This opening portion is covered with a grille 200 attached to be opened and closed. The cooler housing cover 132 protrudes from its upper surface an intake pipe 145 for introducing air required to drive the engine 301 from outside through the air cleaner 310. The intake pipe 145 attaches to an upper end a rainfall entering-prevention cover 145a that prevents rainfall from entering the intake pipe 145.

Figure 6:
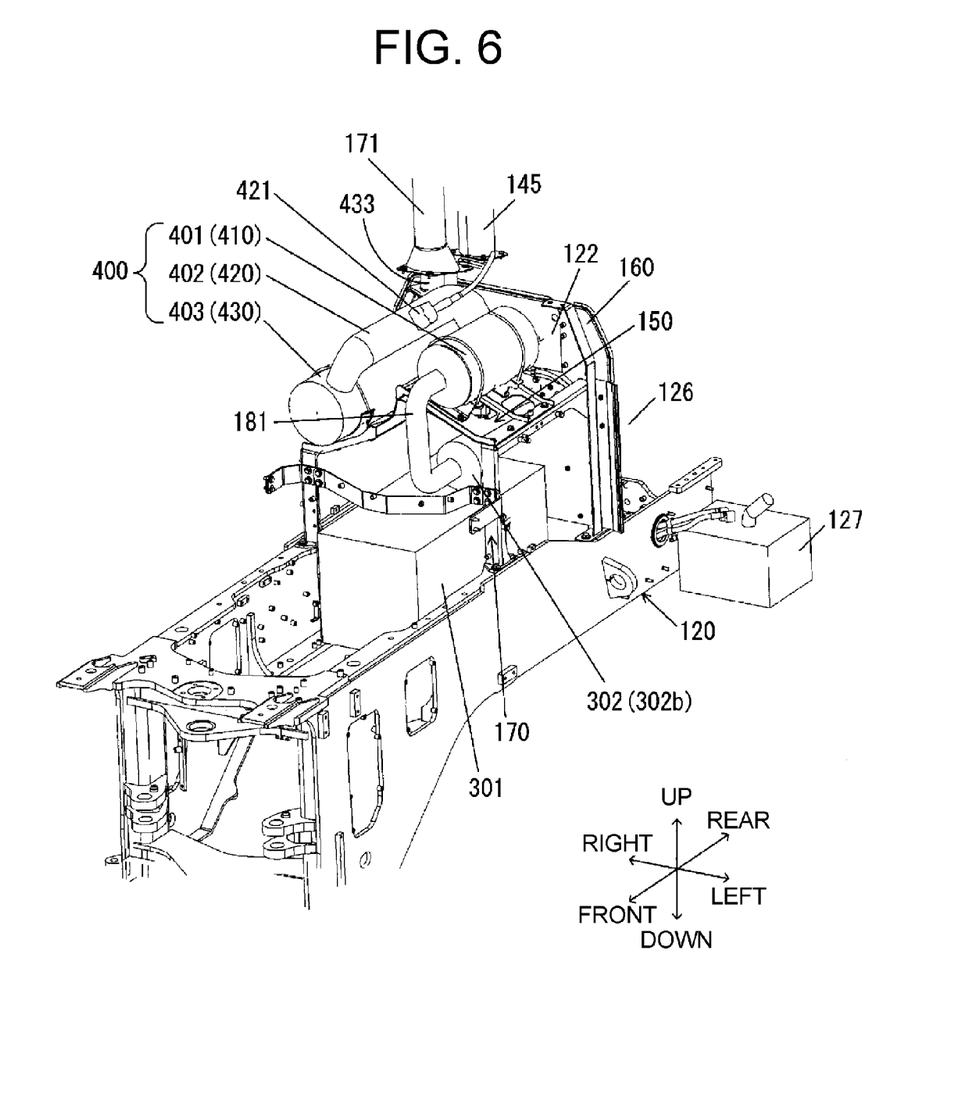
FIG. 6 is a perspective view showing the mounting state of an engine and an exhaust system.
Figure 7:
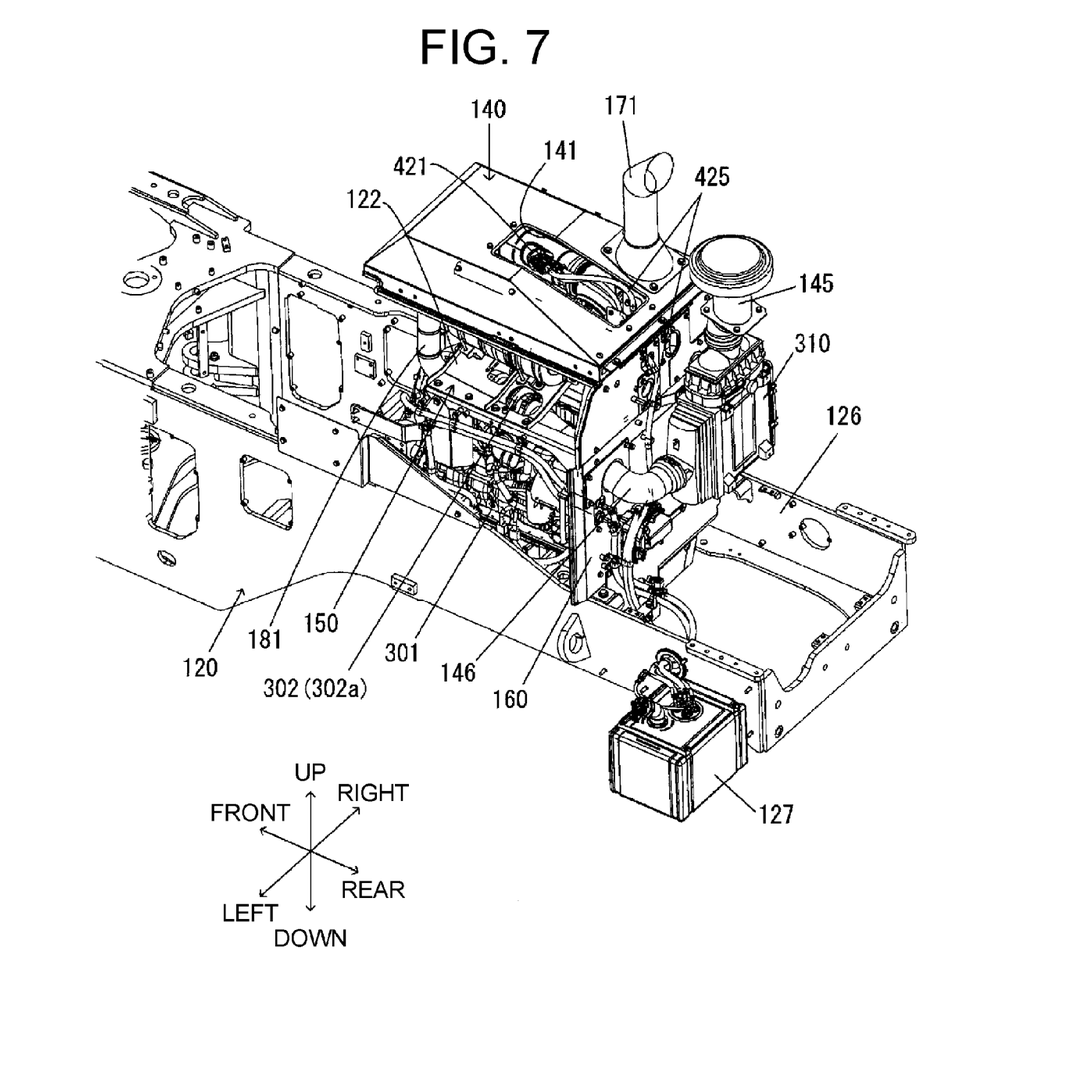
FIG. 7 is a perspective view showing the mounting state of the engine and the exhaust system.
Figure 8:
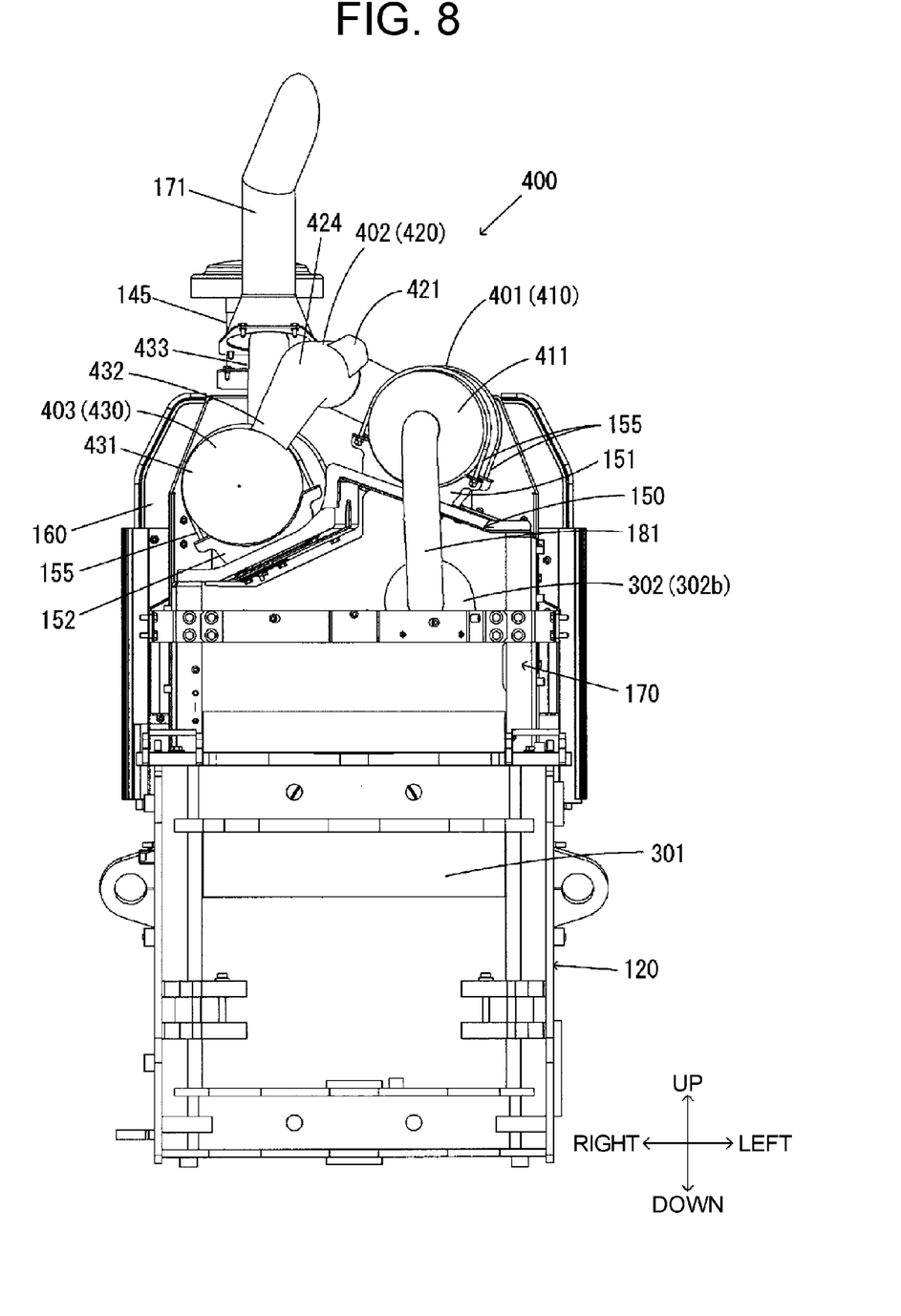
FIG. 8 is a view of the engine and the exhaust system as viewed from the front side.

FIG. 6 and FIG. 7 are perspective views showing the mounting state of the engine 301 and an exhaust system 400 referred to later, and FIG. 8 is a view of the engine 301 and the exhaust system 400 as viewed from front side. Within the engine room 122, the engine 301 is attached to an engine attaching bracket not shown of the rear body 120. A supercharger (turbocharger) 302 is attached to the engine 301. Incidentally, in the present embodiment, the supercharger 302 is arranged to direct an intake port of a compressor 302a (FIG. 7) rearward and to direct an exhaust port of a turbine 302b (FIG. 6 and FIG. 8) forward. The bulkhead 160 is disposed between the engine room 122 and the cooler chamber 126. A urea water tank 127 is disposed on the rear left side of the rear body 120.

The air cleaner 310 is provided right behind the bulkhead 160 within the cooler chamber 126. The air cleaner 310 and an intake port of the compressor 302a are connected through an intake pipe 146.

As well shown in FIG. 8, an exhaust system mounting bracket 150 is attached to an upper portion of a chassis 170 upstanding on the rear body 120. The exhaust system 400 is attached to the exhaust system mounting bracket 150. The exhaust system 400 is arranged within the engine room 122 and over the engine 301.

Figure 9:
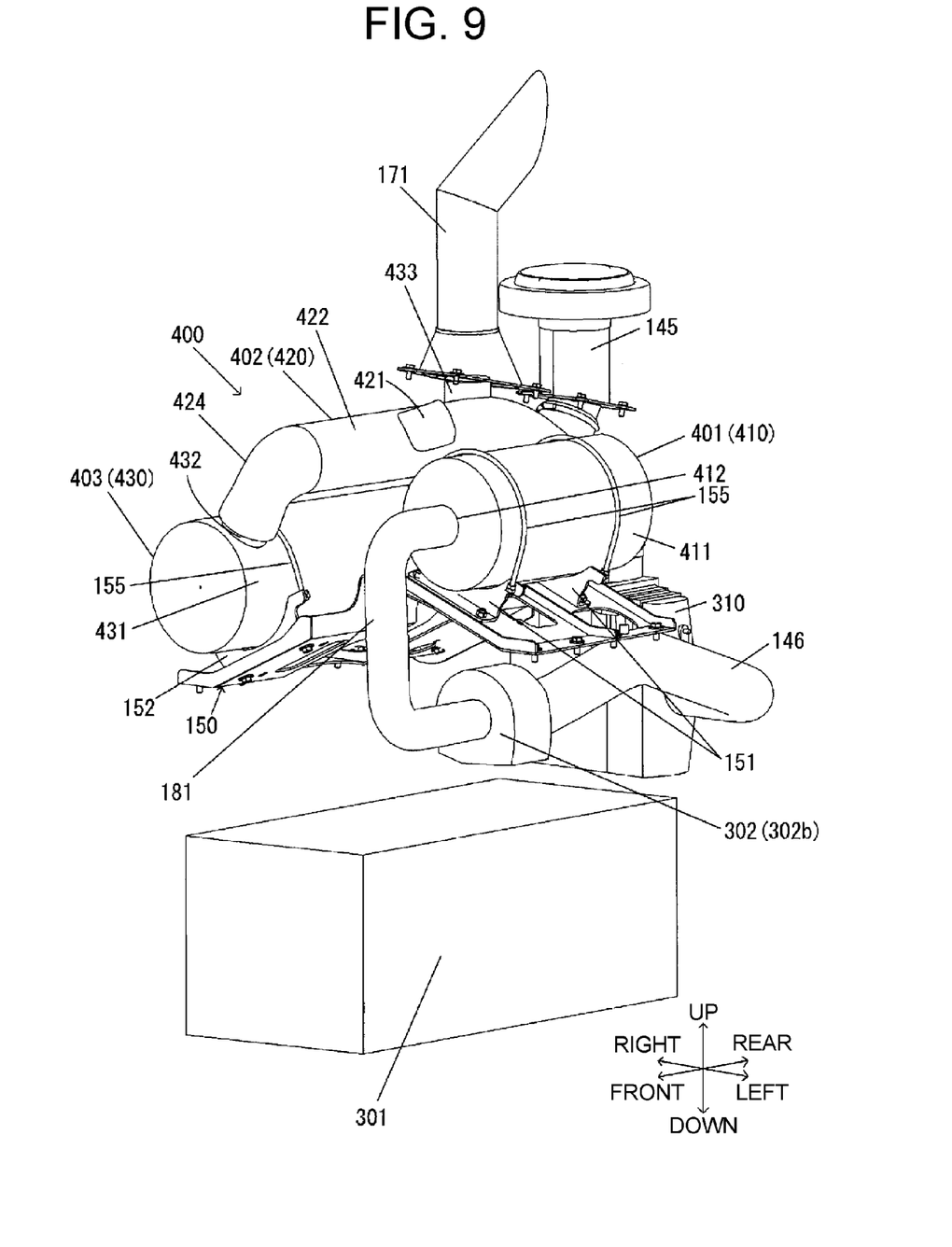
FIG. 9 is a perspective view of the engine and the exhaust system.
Figure 10:
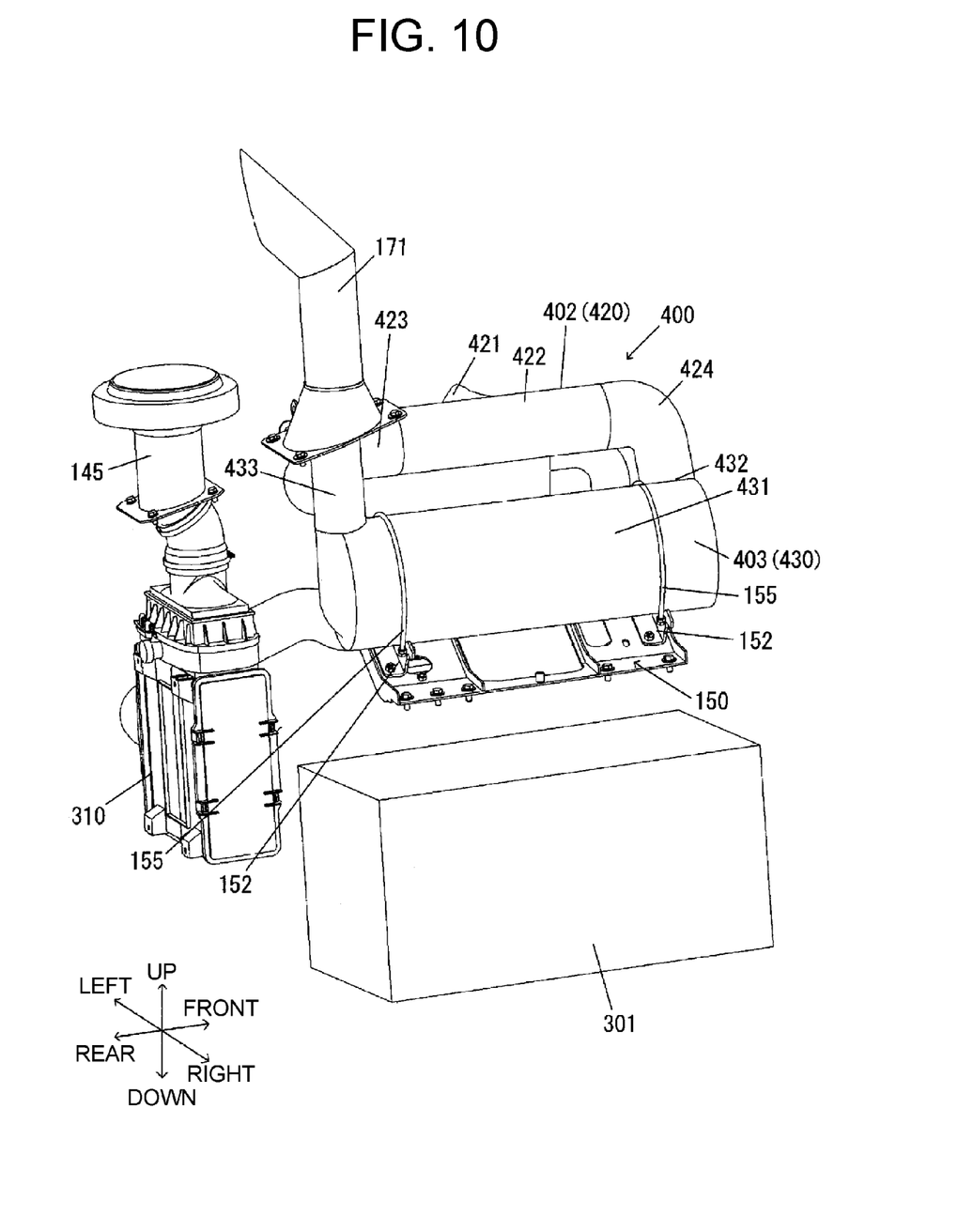
FIG. 10 is a perspective view of the engine and the exhaust system.
Figure 11:
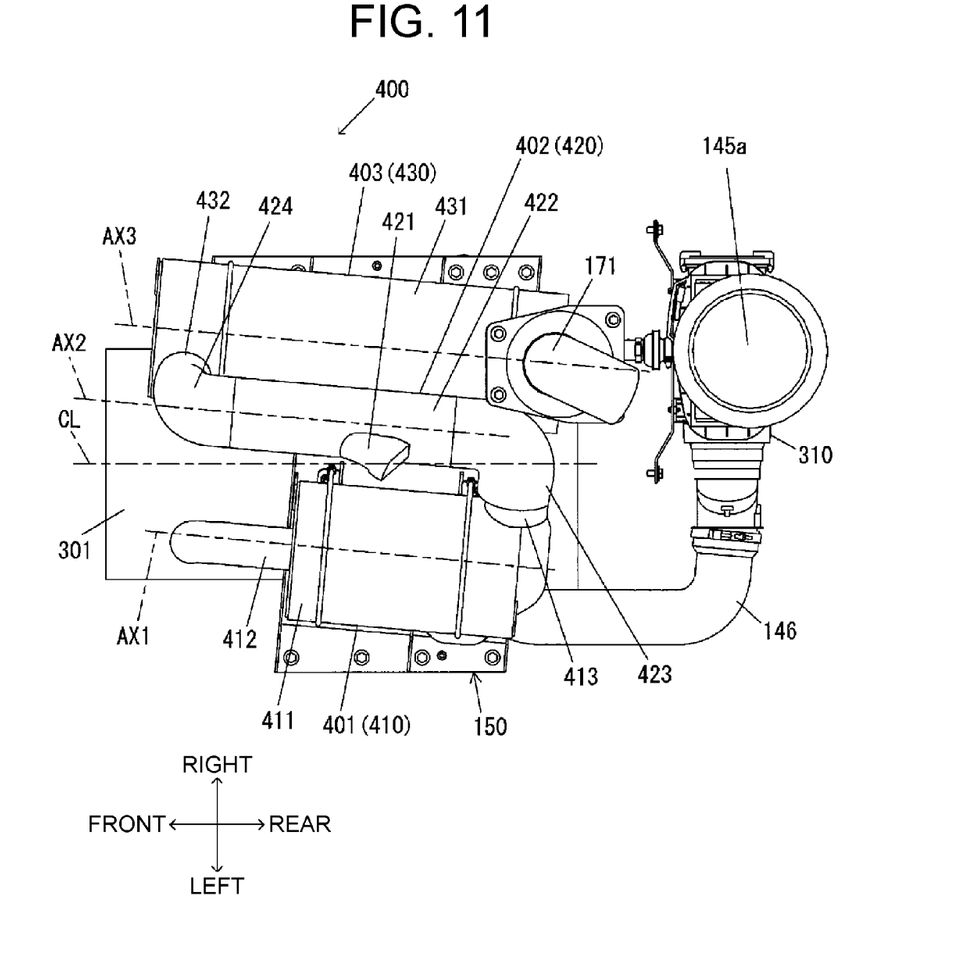
FIG. 11 is a plan view of the engine and the exhaust system.
Figure 12:
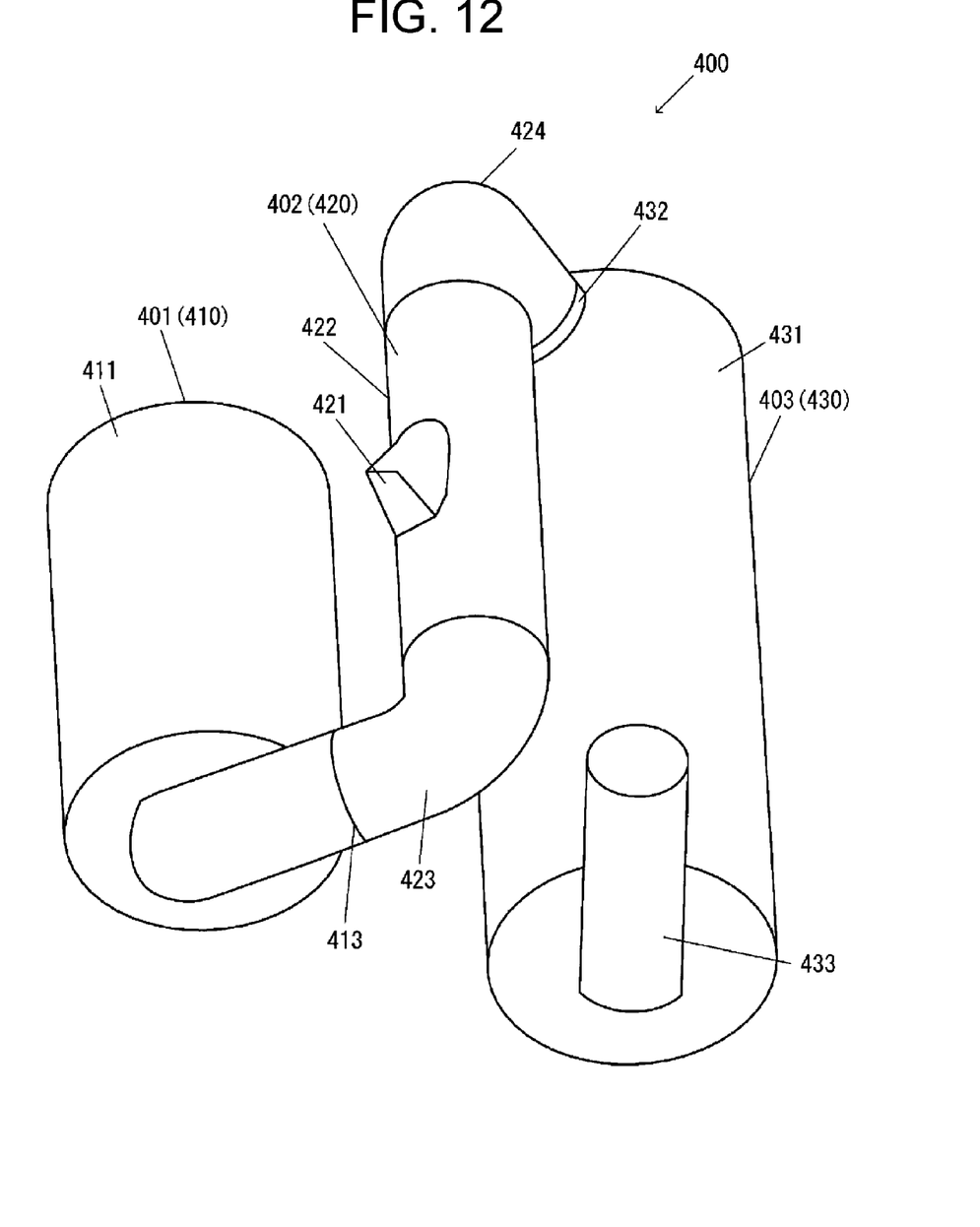
FIG. 12 is a perspective view of the exhaust system.

FIG. 9 and FIG. 10 are perspective views of the engine 301 and the exhaust system 400, FIG. 11 is a plan view of the engine 301 and the exhaust system 400, and FIG. 12 is a perspective view of the exhaust system 400. The exhaust system 400 has a first exhaust system 401, a second exhaust system 402 and a third exhaust system 403 as recited in order from the upper stream along the flow of the exhaust gas.

In the present embodiment, an oxidation catalytic device 410 is used for the first exhaust system 401, an urea water adding device 420 is used for the second exhaust system 402, and a urea SCR device 430 is used for the third exhaust system 403. The oxidation catalytic device 410 is equipped in a casing 411 taking an almost cylindrical shape with an oxidation catalyst (DOC: Diesel Oxidation Catalyst) that removes nitrogen monoxide (NO), carbon monoxide (CO), hydrocarbon (HC) and the like contained in exhaust gas through oxidation. The casing 411 is provided at one end portion of an almost cylindrical shape with an exhaust gas inlet 412 (FIG. 9) and around at the other end portion with an exhaust gas outlet 413 (FIG. 12) directed toward the obliquely right-above.

The urea water adding device 420 is equipped with a urea water injection valve 421 and a pipe 422 connecting the oxidation catalytic device 410 to the urea SCR device 430 and represents a pipe shape (cylindrical shape). The urea water injection valve 421 is provided in the mid course of the pipe 422. The urea water injection valve 421 is supplied with the urea water within a urea water tank 127 (FIG. 7) through a urea water supply pipe 425 (FIG. 7) and a urea water pump not shown. The urea water injection valve 421 injects urea water within the pipe 422 in response to a control signal from a controller not shown.

The urea SCR device 430 is equipped inside the casing 431 taking an almost cylindrical shape with a catalyst of a urea SCR (Selective Catalytic Reduction) method that deoxidizes and purifies the nitrogen oxides (NOx) contained in the exhaust gas. The casing 431 is provided with an exhaust gas inlet 432 on a lateral face at around one end portion of an almost cylindrical shape and is provided with an exhaust gas outlet pipe 433 extending upward around at the other end portion. When the exhaust gas to which the urea water is added by the urea water adding device 420 flows into the urea SCR device 430, the catalyst of the urea SCR method generates ammonia from the urea water, and the NOx in the exhaust gas is subjected to a reductive reaction by the ammonia to be decomposed into water and nitrogen.

As well shown in FIG. 11, the exhaust system 400 has the oxidation catalytic device 410, the urea water adding device 420 and the urea SCR device 430 juxtaposed in order from the left. The oxidation catalytic device 410, the urea water adding device 420 and the urea SCR device 430 are arranged to be slanted relative to the center line CL extending in the front-rear direction of the wheel loader 100 to direct the front end sides toward the obliquely front right side and to direct the rear end sides toward the obliquely rear left. That is, the oxidation catalytic device 410 is arranged in the state that the almost cylindrical casing 411 directs an end surface on the inlet 412 side toward the obliquely front right and directs an end surface of the outlet 413 toward the obliquely rear left so that the center axis AX1 of the casing 411 is slanted relative to the front-rear direction of the wheel loader 100.

Likewise, the pipe 422 for the urea water adding device 420 is arranged at an obliquely right upper side of the oxidation catalytic device 410 and at an obliquely left upper side of the urea SCR device 430 with the center axis AX2 slanted relative to the front-rear direction of the wheel loader 100 so that the rear side is slightly shifted toward the left in comparison with the front side. Likewise, the urea SCR device 430 is arranged in the state that the almost cylindrical casing 431 directs an end surface on the inlet 432 side toward the obliquely front right and directs an end surface of the outlet pipe 433 (FIG. 12) toward the obliquely rear left so that the center axis AX3 of the casing 431 is slanted relative to the front-rear direction of the wheel loader 100.

As mentioned before, the exhaust systems 400 is attached to the exhaust system mounting bracket 150. Specifically, as well shown in FIG. 8 and FIG. 9, the exhaust system mounting bracket 150 is a mountain shape bracket that slants to become high from the right and left sides toward the center. The exhaust system mounting bracket 150 is provided on a left slope with an attaching portion 151 for the oxidation catalytic device 410 and on a right slope with an attaching portion 152 for the urea SCR device 430.

The oxidation catalytic device 410 is fixed to the attaching portion 151 by being fastened by U-bolts 155. The urea SCR device 430 is fixed to the attaching portion 152 by being fastened by U-bolts 155.

The inlet 412 of the oxidation catalytic device 410 and the exhaust port of the turbine 302b of the supercharger 302 are connected through an exhaust pipe 181. Referring to FIG. 11 and FIG. 12, the inlet of the pipe 422 of the urea water adding device 420, that is, an end on the rear side of the pipe 422 is connected to the outlet 413 of the oxidation catalytic device 410 through an elbow joint 423. The outlet of the pipe 422, that is, an end on the front side of the pipe 422 is connected to the inlet 432 of the urea SCR device 430 through an elbow joint 424. Referring to FIG. 10, an extreme end of an outlet pipe 433 of the urea SCR device 430 is inserted into a lower portion of the tailpipe 171 attached to the engine cover 140.

In the exhaust system 400 configured like this, the exhaust gas from the engine 301 is discharged from the exhaust port of the turbine 302b of the supercharger 302 and flows into the oxidation catalytic device 410 through the exhaust pipe 181. The exhaust gas that is removed of nitrogen monoxide (NO), carbon monoxide (CO), hydrocarbon (HC) and the like by the oxidation catalytic device 410 is discharged from the outlet 413 of the oxidation catalytic device 410 and flows into the pipe 422 of the urea water adding device 420. The exhaust gas to which urea water is added by the urea water injection valve 421 within the pipe 422 flows into the urea SCR device 430. The exhaust gas that is removed of nitrogen oxides (NOx) by the urea SCR device 430 is discharged outside through the outlet pipe 433 and the tailpipe 171.

———About Arrangement of Exhaust System 400———

The respective systems 410, 420, 430 configuring the exhaust systems 400 are arranged so that each lengthwise direction, that is, the extending direction becomes almost the front-rear direction of the vehicle. Thus, it is possible to arrange the respective systems 410, 420, 430 within a limited space. Further, as is clear from FIG. 8 through FIG. 10, in the exhaust system 400, the urea water adding device 420 is arranged between the oxidation catalytic device 410 and the urea SCR device 430 and at a higher position than the oxidation catalytic device 410 and the urea SCR device 430 in a front view and a side view. Thus, it is possible to shorten the distance in the right-left direction or in the vehicle width direction between the oxidation catalytic device 410 and the urea SCR device 430, and hence, it is possible to make narrow the width in the right-left direction of the exhaust system 400. Because the respective systems 410, 420, 430 can be arranged to be compact, it becomes possible to arrange all of the respective systems 410, 420, 430 within the engine room 122 and over the engine 301. As a consequence, the housing on the rear side for the operator's cabin 122 can be restrained from becoming large in dimension, so that the rear view from the operator's cabin 122 can be secured.

Further, because the urea water adding device 420 is arranged at the higher position than the oxidation catalytic device 410 and the urea SCR device 430, it becomes possible to make the urea water injection valve 421 come close to the opening 141 of the engine hood 140, so that the maintenance of the urea water injection valve 421 becomes easy.

Incidentally, as well shown in FIG. 4, in the wheel loader 100, the protruding amounts of right and left ends at the upper portion of the engine room 122 are suppressed for the purpose of securing the rear view from the operator's cabin 121. Therefore, when the wheel loader 100 is viewed from the rear side, the right and left ends at the upper portion of the engine room 122 take the shape as chamfered. By making narrow the width in the right-left direction of the exhaust system 400 as described above, it is possible to suppress the protrusion at the upper portion of the right and left ends of the engine room 122, so that the rear view from the operator's cabin 121 becomes favorable.

Figure 13:
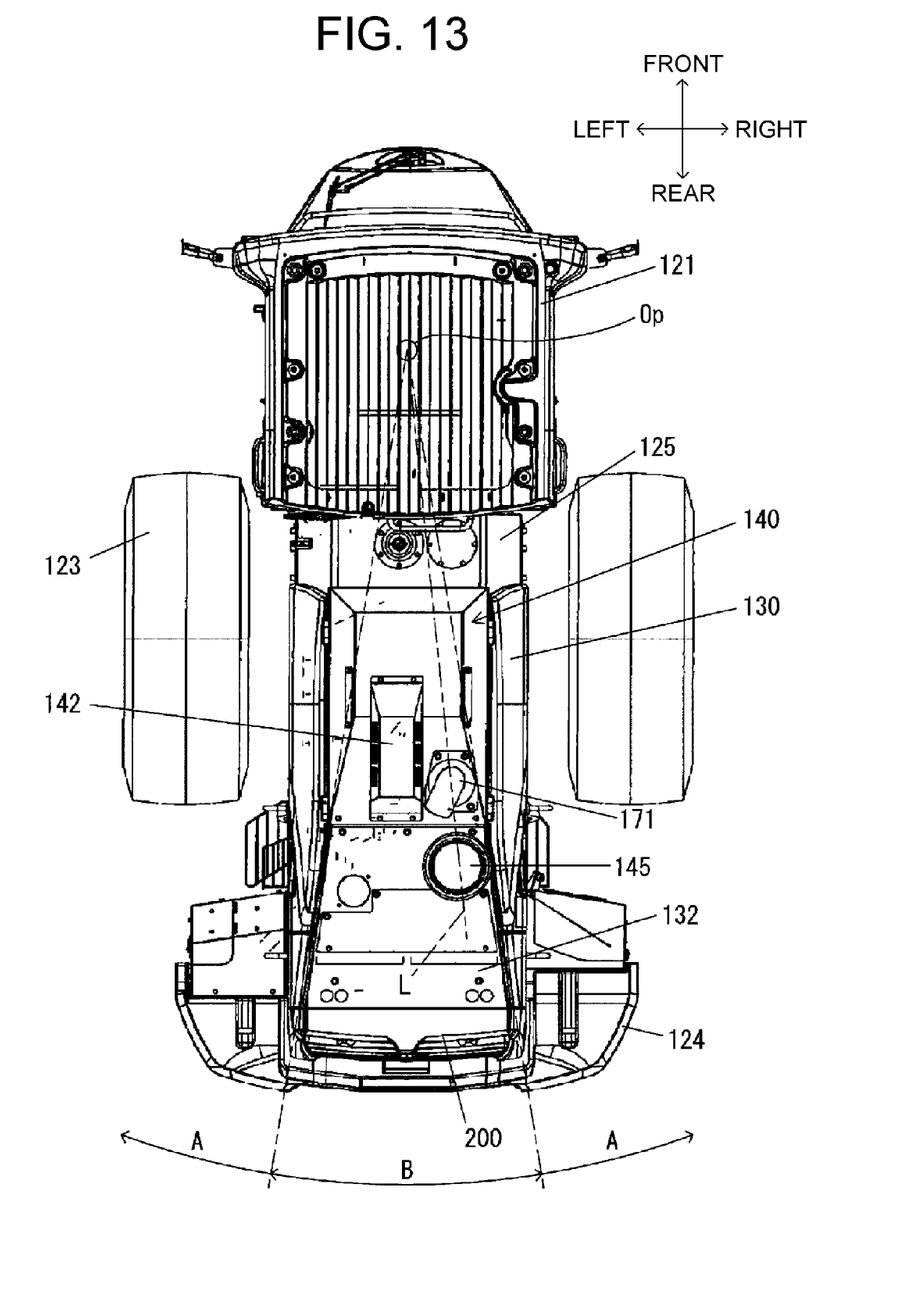
FIG. 13 is a plan view for describing the rear view from an operator's cabin.

FIG. 13 is a plan view of the rear body 120 for explaining the rear view from the operator's cabin 121. A round mark with a symbol Op at the operator's cabin 121 represents the position of the operator's head at the operator's cabin 121. Areas indicated by arrow marks A are the areas that are directly observed visually by the operator at a high frequency. An area indicated by an arrow mark B is the area that is confirmed by the supplemental use of a back monitor and the like for rear confirmation. Incidentally, the area B is the area in which the engine room 122 and the cooler chamber 126 restrict the rear view of the wheel loader 100.

The outlet pipe 433 of the urea SCR device 430 is arranged on the side behind the engine room 122. Thus, it is possible to keep the tailpipe 171 away from the operator's cabin 122, and thus, the rear view from the operator's cabin 121 becomes favorable and the noise that arrives at around the operator's ears can be suppressed. Further, the urea SCR device 430 is arranged to slant relative to the front-rear direction of the wheel loader 100 so that the urea SCR device 430 directs the front end side toward the obliquely front right side and directs the rear end side provided with the outlet pipe 433 toward the obliquely rear left side. That is, the urea SCR device 430 that is arranged on the right side of the center line CL extending in the front-rear direction of the wheel loader 100 is slanted to make the outlet pipe 433 of the urea SCR device 430 come closer to the center line CL. Thus, it becomes possible to make the tailpipe 171 come close to the center line CL, that is, to the center in the right-left direction of the wheel loader 100, so that the rear view from the operator's cabin 121 becomes favorable. Further, as mentioned earlier, even where the engine room 122 restrains the right and left ends at the upper portion from protruding and thus, narrows the width in the right-left direction, the tailpipe 171 is made to come close to the center line CL, so that the exhaust system 400 can be arranged in the limited space.

Referring to FIG. 11, after flowing through the oxidation catalytic device 410 from the front side toward the rear side, the exhaust gas purified by the exhaust system 400 flows through the pipe 422 of the urea water adding device 420 from the rear side toward the front side and then, flows through the urea SCR device 430 from the front side toward the rear side. That is, in the exhaust system 400, the respective systems 410, 420, 430 are connected so that the exhaust gas flows in the form of an S-shape. Thus, it is possible to make the exhaust gas flow efficiently through the respective systems 410, 420, 430 that are arranged in parallel to make the extending directions in agreement.

Referring to FIG. 9, an exhaust port of the turbine 302b of the supercharger 302 is directed forward on the left side of the engine 301, and the inlet 412 of the oxidation catalytic device 410 is directed forward on the left side of the center line CL of the wheel loader 100. Thus, the exhaust port of the turbine 302b and the inlet 412 of the oxidation catalytic device 410 can be connected in a short distance and the shape of the exhaust pipe 181 is not complicated, so that the resistance in exhaust can be restrained thereby contributing an improvement in fuel efficiency.

Because the exhaust system mounting bracket 150 fixing the exhaust system 400 takes the mountain shape that slants to become high from the right and left sides toward the center, the space for maintenance of the engine 301 can be secured over the engine 301, so that the capability for the maintenance of the engine 301 can be improved.

———About Arrangement of Air Cleaner 310———

As aforementioned with reference to FIG. 7, the air cleaner 310 is provided within the cooler chamber 126 and right behind the bulkhead 160. Like this, by providing the air cleaner 310 within the cooler chamber 126 divided from the engine room 122 by the bulkhead 160, the heat from the engine 301 and the exhaust system 400 can be restrained from being influenced on the air cleaner 310. Thus, the air drawn by the engine 301 is restrained from rising in temperature, and thus, it is possible to restrain the intake efficiency from being lowered.

Referring to FIG. 7, the air cleaner 310 is provided behind the engine 301, and the intake port of the compressor 302a of the supercharger 302 is directed rearward. Thus, because the air cleaner 310 and the intake port of the compressor 302a of the supercharger 302 can be connected in a short distance and because the shape of the intake pipe 146 does not become complicated, it is possible to suppress the intake resistance thereby improving the fuel efficiency.

Incidentally, in the present embodiment, as shown in FIG. 13, the air cleaner 310 and the intake pipe 145 are arranged so that the intake pipe 145 is located on a straight line L connecting the head position Op of the operator at the operator's cabin 121 with the tailpipe 171. That is, as viewed from the operator's cabin 121, the intake pipe 145 protruding from the upper surface of the cooler housing cover 132 and the tailpipe 171 overlap with each other. Thus, it becomes possible to narrow the area that the intake pipe 145 and the tailpipe 171 obstruct the rear view from the operator's cabin 121, and hence, the rear view from the operator's cabin 121 becomes favorable. Further, in the present embodiment, since the intake pipe 145 and the tailpipe 171 exist within the area B indicated in FIG. 13, it is possible to secure the field of view in the area A that is directly observed visually at a high frequency, and hence, the rear view from the operator's cabin 121 becomes favorable.

———About Piping Arrangement of Urea Water Supply Pipe 425———

In the present embodiment, as shown in FIG. 7, the urea water supply pipe 425 is arranged so that the distance for the piping arrangement within the engine room 122 becomes as short as possible. That is, although the urea water supply pipe 425 is arranged from the urea water tank 127 on the rear left side of the rear body 120 to the urea water injection valve 421 in the engine room 122, the route for arrangement is designed to pass through the cooler chamber 126 to a position as close to the urea water injection valve 421 as possible. By doing like this, the engine 301 and the exhaust system 400 are restrained from applying heat influence to the urea water in the urea water supply pipe 425, so that the quality deterioration of the urea water due to heat can be restrained.

———Modifications———

(1) In the foregoing description, the oxidation catalytic device 410 is used for the first exhaust system 401, the urea water adding device 420 is used for the second exhaust system 402, and the urea SCR device 430 is used for the third exhaust system 403. However, this is one example, to which the present invention is not limited. For example, for the respective exhaust systems 410, 420, 430, there may be used exhaust devices of other kinds such as mufflers and the like which do not have a function to purify the exhaust gas.

(2) In the foregoing description, the oxidation catalytic device 410 is provided on the left side, while the urea SCR device 430 is provided on the right side. However, the present invention is not limited to this. The oxidation catalytic device 410 may be provided on the right side, while the urea SCR device 430 may be provided on the left side.

(3) In the foregoing description, as shown in FIG. 13, the configuration is taken to position the intake pipe 145 on the straight line L that connects the head position Op of the operator at the operator's cabin 121 with the tailpipe 171. However, the present invention is not limited to this. Although positioning the intake pipe 145 on the straight line L is not essential, it is preferable in terms of securing the rear view that as viewed from the operator's cabin 121, the intake pipe 145 overlaps at least a part of the tailpipe 171.

(4) Although the foregoing description has been made taking the wheel loader as one example of the work machine, the present invention is not limited to this, and the present invention may be applicable to other work machines such as, for example, hydraulic excavators and the like.

(5) The foregoing respective embodiment and modifications may be combined with one another.

Incidentally, the foregoing description is only one example, and the present invention is not limited to these details. Other modes that can be conceived of under the technical concept of the present invention may also be encompassed within the scope of the present invention.

The disclosed contents in the following basic application for priority will be incorporated herein by reference.

Japanese Patent Application No. 2014-265818 (filed: Dec. 26, 2014)

REFERENCE SIGNS LIST

100: Wheel loader (Work machine)
122: Engine room
126: Cooler chamber
132: Cooler chamber housing cover
140: Engine hood
145: Intake pipe
150: Exhaust system mounting bracket (Bracket)
160: Bulkhead
171: Tailpipe (Exhaust pipe)
301: Engine
310: Air cleaner
400: Exhaust system
401: First exhaust system (First exhaust system)
402: Second exhaust system (Second exhaust system)
403: Third exhaust system (Third exhaust system)
410: Oxidation catalytic device
420: Urea water adding device
430: Urea SCR device

The invention claimed is:

1. A work machine comprising:
   an engine for the work machine; and
   an exhaust system for treating exhaust gas from the engine;
   wherein the exhaust system includes:
      a first exhaust system taking an almost cylindrical shape and including a first inflow port for the exhaust gas on one end side and a first discharge port for the exhaust gas on the other end side;
      a second exhaust system taking an almost cylindrical shape and including a second inflow port for the exhaust gas from the first exhaust system on one end side and a second discharge port for the exhaust gas on the other end side, the second exhaust system being connected on a downstream side of the first exhaust system; and
      a third exhaust system taking an almost cylindrical shape and including a third inflow port for the exhaust gas from the second exhaust system on one end side and a third discharge port for the exhaust gas on the other end side, the third exhaust system being connected on a downstream side of the second exhaust system,
   the first exhaust system and the third exhaust system are arranged to be in parallel with the respective one ends directed in the same direction,
   in a plan view, the second exhaust system is arranged with the other end side directed in the same direction as the respective one end sides of the first exhaust system and the third exhaust system to be in parallel with the first exhaust system and the third exhaust system between the first exhaust system and the third exhaust system, the second exhaust system in a side view being arranged above the first exhaust system and the third exhaust system, and
   the exhaust system is attached to the work machine so that in a plan view, the third exhaust port comes close to a center line extending in a front-rear direction of the work machine with the extending direction of the third exhaust system slanted relative to the extending direction of the center line.

2. The machine according to claim 1, further comprising:
   an air cleaner for purifying intake air; and
   a bulkhead separating an engine room in which the engine is arranged, from a cooler chamber provided behind the engine room;
   wherein the air cleaner is arranged in the cooler chamber, and
   the exhaust system is attached to the work machine in the state that the other end with the third exhaust port is directed rearward of the work machine.

3. The work machine according to claim 2, further comprising:
   an engine hood covering an upper portion of the engine room in which the engine is arranged;
   a cooler housing cover covering an upper portion of the cooler chamber;
   an exhaust pipe protruding from the upper portion of the engine hood for discharging the exhaust gas from the third discharge port outside; and
   an intake pipe protruding from the upper portion of the cooler housing cover for taking intake air from outside through the air cleaner,
   wherein as viewed from the operator's cabin of the work machine, the exhaust pipe and the intake pipe overlaps each other at least partly.

4. The work machine according to claim 1, further comprising
   a bracket fixing the exhaust system in the engine room in which the engine is arranged,
   wherein the bracket takes a mountain shape having right and left slopes that slant to become high from the right and left to a center of the work machine,
   the first exhaust system is fixed to any one of the right and left slopes, and
   the third exhaust system is fixed to the other of the right and left slopes.

* * * * *